United States Patent [19]

Manning et al.

[11] Patent Number: 5,000,858
[45] Date of Patent: Mar. 19, 1991

[54] METHOD FOR REMOVING HEXAVALENT CHROMIUM FROM WATER

[75] Inventors: Richard E. Manning, Atlantic Highlands, N.J.; Ted H. Wells, Bowling Green, Ky.

[73] Assignee: Coltec Industries Inc., New York, N.Y.

[21] Appl. No.: 381,095

[22] Filed: Jul. 17, 1989

[51] Int. Cl.$^5$ ............................................. C02F 1/62
[52] U.S. Cl. ................................. 210/709; 210/720; 210/725; 210/727; 210/743; 210/747; 210/913
[58] Field of Search ............... 210/709, 720, 724, 725, 210/726, 727, 732, 739, 743, 757, 913, 747; 166/255, 257

[56] References Cited

U.S. PATENT DOCUMENTS

| | | | |
|---|---|---|---|
| 3,575,853 | 4/1971 | Gaughan et al. | 210/720 |
| 3,716,485 | 2/1973 | Robertson | 210/50 |
| 3,784,669 | 1/1974 | Elges et al. | 423/43 |
| 3,810,542 | 5/1974 | Gloster et al. | 210/720 |
| 4,260,491 | 4/1981 | Cassidy et al. | 210/720 |
| 4,268,486 | 5/1981 | Noack et al. | 423/55 |
| 4,321,149 | 3/1982 | Hawxhurst et al. | 210/720 |
| 4,338,200 | 7/1982 | Zeijlstra | 210/724 |
| 4,343,706 | 8/1982 | Etzel et al. | 210/667 |
| 4,400,243 | 8/1983 | Ebdon et al. | 204/419 |
| 4,671,882 | 6/1987 | Douglas et al. | 210/720 |
| 4,804,528 | 2/1989 | Warren | 423/607 |
| 4,814,091 | 3/1989 | Napier et al. | 210/718 |

*Primary Examiner*—Peter Hruskoci
*Assistant Examiner*—Krisanne Shideler
*Attorney, Agent, or Firm*—Howard S. Reiter

[57] ABSTRACT

A system and method for removing heavy metals, such as hexavalent chromium from water. The system comprises at least two reactor containers for independently mixing chemicals with water. The system further comprises a flocculator and a clarifier whereby each container can separately treat water therein and separately transfer the treated water to the flocculator such that water treated in batches at the containers can be treated in a relatively independent manner with relatively constant results. The method of chemically treating the water in the containers includes decreasing the pH value, adding a reducing agent and then increasing the pH value in preparation for precipitating the heavy metals in the clarifier.

19 Claims, 2 Drawing Sheets

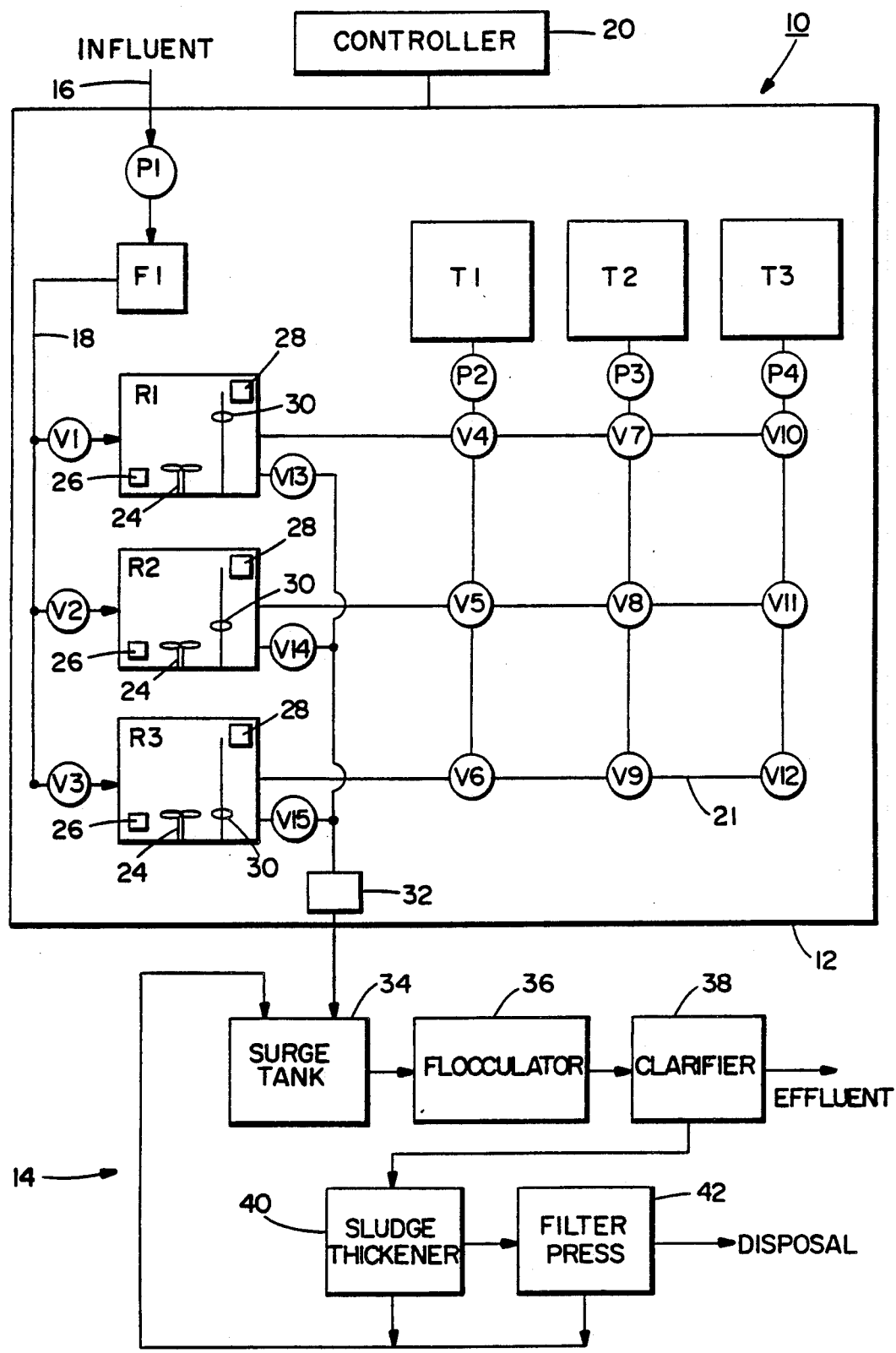

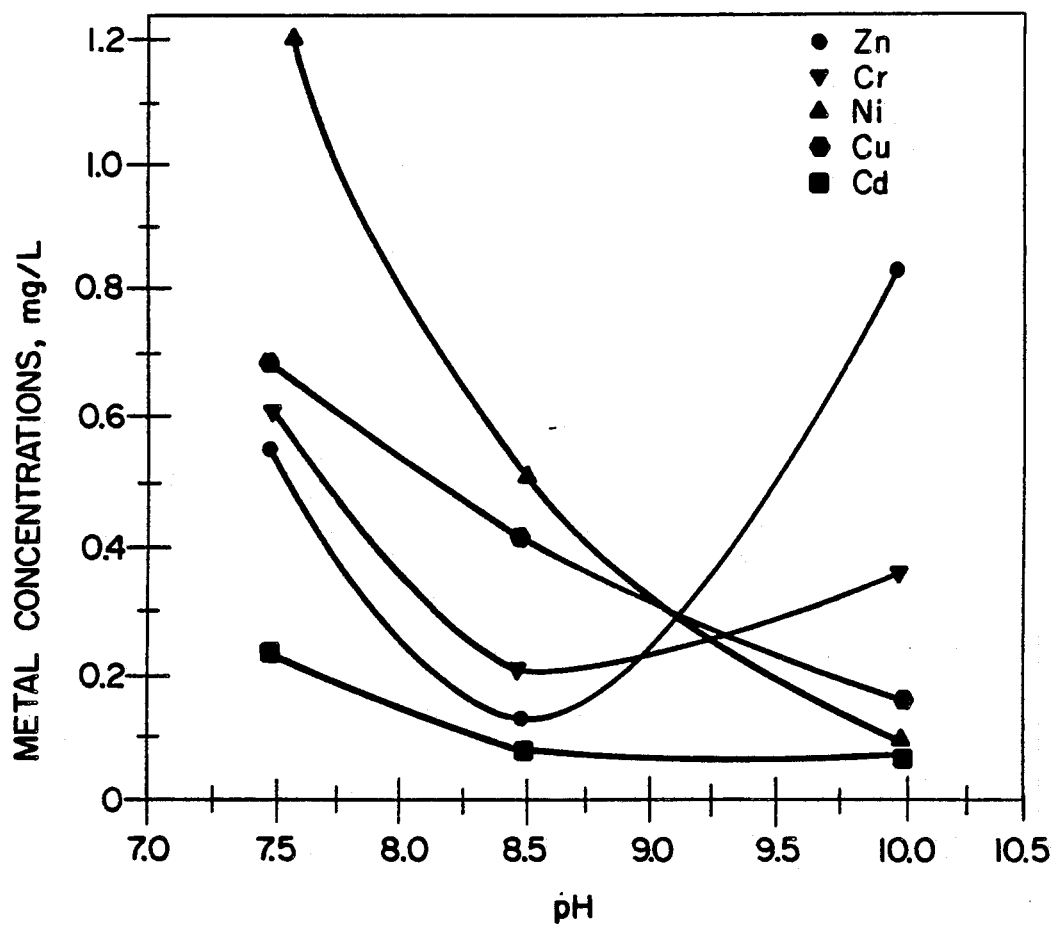

METHOD FOR REMOVING HEXAVALENT CHROMIUM FROM WATER

BACKGROUND OF THE INVENTION

I. Field of the Invention

The present invention relates to systems and methods for treating contaminated groundwater and process effluent and, more particularly, to a system and method for removing heavy metals from water.

II. Prior Art

In the past, certain industries have used heavy metals, such as hexavalent chromium, in certain industrial processes. Although heavy metal compositions generally enjoy wide spread industrial usage, their residues are objectionable from an environmental standpoint to the extent that they form an objectionable constituent of the waste water effluent. The use of heavy metal compositions, especially chromates, is, however, essential to many industrial operations. Although various types of methods and processes have been used in the past to remove heavy metals, such as in U.S. Pat. No. 3,716,485, such processes have generally only been used with treating direct industrial waste.

A problem has arisen in that although modern environmental protection laws help to prevent industrial waste having heavy metals contained therein from being discharged without being treated, accidents, illegalities, and discharges which occurred prior to environmental protection laws having been enacted are allowing heavy metal compositions to enter and contaminate fresh water supplies in nearby aquifers.

It is therefore an objective of the present invention to provide a groundwater treatment system for removing, or at least reducing, heavy metal compositions from groundwater.

It is another objective of the present invention to provide a system for removing heavy metal contaminants from water using a batch process which nevertheless is capable of providing relatively constant and uniform removal.

It is a further objective of the present invention to provide a system for removing heavy metals from water that can be used for both direct industrial process waste water as well as contaminated groundwater.

SUMMARY OF THE INVENTION

The foregoing problems are overcome and other advantages are provided by a system and method of removing heavy metals from water.

In accordance with one method of the invention, a method is provided comprising the steps of transporting water contaminated with heavy metal contaminants into a container, decreasing the pH value of the water in the container to below 3; adding a reducing agent to the water in the container to react with the heavy metal contaminants; increasing the pH value of the solution in the container to above 8; adding a flocculant to the solution; flocculating or coagulating the solution; and clarifying the solution to remove solids from the water.

In accordance with another method of the invention, a method is provided for removing Hexavalent Chromium contaminants from groundwater comprising the steps of transporting water from an aquifer into a reactor container; decreasing the pH value of the water in the container; adding a reducing agent to the water in the container; increasing the pH value of the solution in the container; transporting the solution to a flocculator; adding a flocculant to the solution and flocculating the solution; transporting the flocculated solution to a clarifier; and clarifying the solution to remove solids from the water.

In accordance with one system of the invention, a system is provided for removing heavy metal contaminants from water comprising container means, flocculator means and clarifier means. The container means comprises at least one reactor container. The flocculator means is connected to the container means via a first conduit means. The flocculator means has means for adding a flocculant to solutions in the flocculator means transported from the container means. The clarifier means is connected to the flocculator means and has means for separating solids from water whereby each of the containers can separately treat water therein and separately transfer treated water to the flocculator means such that water is treated in batches at the container means to allow for a relatively independent treatment of the water in the containers with relatively consistent results.

BRIEF DESCRIPTION OF THE DRAWINGS

The foregoing aspects and other features of the invention are explained in the following description, taken in connection with the accompanying drawings wherein:

FIG. 1 is a schematic view of a system for removing heavy metal contaminants from water.

FIG. 2 is a graph of optimum pH values for various different metal removals.

DETAILED DESCRIPTION OF THE INVENTION

Referring to FIG. 1, a groundwater treatment system 10 is shown for reducing heavy metal contaiminants from water, such as reducing hexavalent chromium to an insoluble trivalent chromium for separation. The system 10, in the embodiment shown, generally comprises two sections; a chemical treatment section 12 and a physical treatment section 14. In the embodiment shown, the chemical treatment section 12 generally comprises three reactor containers R1, R2 and R3 for mixing chemicals with water to be treated. However, any suitable number of reactor containers may be provided. In the embodiment shown, the chemical treatment section 12 also comprises three chemical reagent holding tanks T1, T2 and T3 for holding reagent chemicals therein for use in the reactors R1, R2, R3. However, any suitable number of reagent tanks may be provided. Generally, influent from a source of contaminated water, such as an aquifer or industrial process waste water, is transported into the chemical treatment section 12 via an inlet conduit 16. A pump P1 can generally pump the water into and through a filter F1. The filter F1 is generally intended to remove all large settleable solids from the contaminated water being pumped from the source of contaminated water prior to entering various different pumps and valves of the water treatment system 10. In a preferred embodiment of the invention the filter F1 is provided as a 100 micron bag filter. However, if a filter is to be used, any suitable type of filtering system may be provided. After passing through the filter F1, the water can pass through a conduit 18 such that the water can be supplied to any one of the reactors R1, R2 or R3. Suitable valves V1, V2 and V3 are provided between the conduit 18 and the reactors R1, R2 and R3, respectively. These three reactor inlet valves V1, V2 and V3 control the entry of water into their respective reactors from the conduit 18. A programmable controller 20, such as a microprocessor, automatically controls the opening and closing of the valves V1, V2 and V3. Generally, the controller 20 is located in an electrical console and has suitable means for an operator or technician to manually override the automatic controller 20. As will be seen below, the controller 20 is generally capable of automatically controlling the operation of all of the valves and pumps in the chemical treatment section 12. Each of the reactors R1, R2 and R3, in addition to having a water inlet control valve, also have a complimentary fluid exit valve V13, V14 and V15, respectively. These fluid exit control valves V13, V14 and V15 control the flow of fluid from the reactors R1, R2 and R3 to a chemical section fluid exit conduit 22 which can transport the fluid from the reactors to the physical treatment section 14.

The reagent tanks T1, T2 and T3 are each provided for holding a separate chemical reagent. In the embodiment shown, tank T1 is intended to hold an acid reagent such as a hydrochloric-type acid. However, any suitable acid may be used. Tank T2 is intended to hold a reducing reagent such as sodium metabisulfite. However, any suitable reducing reagent can be used. Tank T3 is intended to hold a base reagent such as sodium hydroxide. However, any suitable base reagent can be used. Each tank T1, T2 and T3 is provided with a suitable pump P2, P3 and P4, respectively. In the embodiment shown, a valve and conduit matrix system 21 is provided with suitable flow control valves V4 through V12 to allow for the separate and independent delivery of any one of the chemicals stored in the reagent tanks T1, T2, and T3 to any one of the reactors R1, R2, and R3 at any desired time. It must be noted that the embodiment shown in FIG. 1 is a schematic diagram only. Any suitable type of conduit and fluid control may be provided between the reagent tanks T1, T2 and T3 and the reactors R1, R2 and R3. Generally, each of the reactors R1, R2, and R3 comprise a mixer 24, a pH monitor and probe sensor 26, an oxidation reduction potential (ORP) detector 28 and a level sensor 30 such as a float switch. The mixers 24 are generally provided to properly and thoroughly mix water in the reactors with the added reagent chemicals. The level sensors 30 are suitably connected to the controller 20 to indicate the level of the fluids in the reactors R1, R2 and R3 and assure that the reactors are filled to their desired levels. In a preferred embodiment of the invention, the level sensors 30 in each reactor R1, R2 and R3 are each comprised of three sensors; a low level sensor, a mid level sensor and a high level sensor. The high level sensor is generally provided as optional and is intended for indicating that a malfunction has occurred and its tank is being over-filled. The mid level sensor can generally indicate that an operating level of water has been obtained in its reactor. The low level sensor is generally used to indicate that a low level of water is in its reactor and signals the imitation of a fill cycle for its reactor. For the sake of simplicity, the low-level, mid-level and high-level sensors will merely be described below as level sensors 30. The pH sensors 26 are provided to indicate to the controller 20 when a predetermined pH value has been obtained by the fluids in the reactors R1, R2 and R3. The oxidation reduction potential detector 28 is provided to indicate to the controller 20 when a substantially completed reduction of heavy metal has occurred. The chemical treatment section 12 also comprises a heavy metal monitor 32 connected to the chemical section fluid exit conduit 22 which can signal an alarm and/or shut the system down when high levels of heavy metal are detected leaving the chemical treatment section 12 before water travels too far into the system. In a preferred embodiment, a separate heavy metal monitor is located in the pipes immediately leaving each of the reactors R1, R2 and R3.

The chemical treatment section 12 will now be described with treating groundwater from an aquifer which has been contaminated with hexavalent chromium. However, it should be understood that the present system can be used to treat water contaminated with any type of heavy metal contaminant and may also be used for treating industrial waste waters. Like many other heavy metals, hexavalent chromium is soluble in water at high pHs. When treating hexavalent chromium, it is necessary to first reduce it to the trivalent state. Trivalent chromium is not soluble at high pHs and therefore readily precipitates in a clarifier. The contaminated groundwater is treated by first lowering the pH of the water to below 3, preferably 2.5. A reducing agent such as sulfur dioxide, sodium bisulfate, metabisulfite or ferrous sulfate is then added. The general reaction equation using sodium metabisulfite is

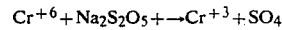

After the reducing agent has chemically changed the hexavalent chromium to trivalent chromium the pH of the solution is raised to about between 8.5 to 9.5 and the trivalent chromium is able to precipitate from the solution. FIG. 2 shows the optimum pH value for various different metal removals.

Samples of contaminated groundwater were pilot tested for treatability. Analysis of the untreated groundwater samples indicated the following contents:

| | |
|---|---|
| Suspended Solids | 129.5 mg/l |
| Total Solids | 2,168 mg/l |
| Arsenic | 0.0088 mg/l |
| Barium | <0.03 mg/l |
| Cadmium | <0.005 mg/l |
| Total Chromium | 2.43 mg/l |
| Hexavalent Chromium | 2.48 mg/l |
| Lead | <0.1 mg/l |
| Mercury | 0.0015 mg/l |
| Silver | 0.03 mg/l |
| Selenium | <0.001 mg/l |

Jar pilot tests were performed on the above groundwater samples. In a first pilot test a supply of the above contaminated groundwater having a pH of 7 and a hexavalent chromium level of 2.48 mg/l was treated. The chemical procedure generally comprised three steps. In the first step, adjustments were made to drop the pH value of the water from 7 to 2 standard units using 35% hydrochloric acid at a concentration of 1 mg/l. In step two of the procedure, 250 mg/l of sodium metabisulfite was added to the batch to accomplish complete hexavalent chromium reduction. In step three of the procedure the pH solution of the batch was adjusted to 8.9 standard units with the addition of 600 mg/l of sodium hydroxide. The treated solution was then physically treated with the addition of anionic polymer to flock and settle trivalent chromium precipitant with an average use of 4 mg/l of polymer. The physical treatment of the chemically treated solution will be further described below. The results of this first pilot test resulted in a pH of 8.5, and hexavalent chromium level of 0.0 and a trivalent chromium level of 0.3.

Additional pilot tests were performed in an effort to reduce the total chromium concentration. The following are the results from four additional jar pilot tests performed on the raw samples identified above.

| JAR | pH | $Na_2S_2O_5$ | Polymer | % / % MgOH/NaOH | Non-Filtered Results | Filtered Results |
|---|---|---|---|---|---|---|
| 1 | 8.9 | 250 | 3.0 | 70/30 | .06 | .04 |
| 2 | 7.5 | 300 | 3.0 | 70/30 | .17 | .14 |
| 3 | 8.0 | 200 | 6.0 | 50/50 | .04 | .03 |
| 4 | 9.5 | 275 | 2.0 | 50/50 | .03 | .01 |

In the four jar pilot tests above, adjustments were made to drop the pH to 2.0 standard units using 35% hydrochloric acid. In step 2, the sodium metabisulfite added to reduce hexavalent chromium was at the dosages (mg/l) shown in column 3 above. In step 3, the pH of the solution was adjusted to the values listed in the second column using four different base dosage rates. In step 4, at the physical treatment procedure, the anionic polymer added to floc and settle trivalent precipitant was at the polymer dosages (mg/l) shown in column four above for each sample. A further step was added for the four jar pilot tests listed above in that samples were filtered using a Watman 40 filter paper. It was evident from these four jar pilot tests that sample #4 dosage rate achieved the best results. Therefore, a 50/50 mixture of sodium hydroxide and magnesium hydroxide appears as the best treatment reagent to raise the pH and assist in reducing the trivalent chromium level of the water being treated. It should be mentioned that if a 0.05 trivalent chromium discharge level cannot be consistently obtained, a final multimedia filter should be used. The best treatment reagent dosages appear to be 1 mg/l hydrochloric acid, 250 mg/l sodium metabisulfite, 300 mg/l sodium hydroxide, 300 mg/l magnesium hydroxide with a final addition of 4 mg/l anionic polymer at the physical treatment stage of the process.

With reference to FIG. 1, the physical treatment section 14 of the embodiment shown will be described. In the embodiment shown, the physical treatment section 14 generally comprises a surge tank 34, a flocculator 36, a clarifier 38, a sludge thickener 40 and a filter press 42. Generally, treated water or solution from the reactors R1, R2 and R3 can be transported to the surge tank 34 via the chemical section fluid exit conduit 22. In a preferred embodiment, the fluid from the reactors is gravity fed into the surge tank 34. However, in an alternate embodiment of the invention a suitable pump or other alternate means may be used. The surge tank 34 serves the purpose of being a lift station for pumping the fluid through the flocculator 36 to the clarifier 38 and provides a constant flow rate to the clarifier. Because the fluid coming from the reactors is transported from the chemical section 12 to the physical section 14 in a continuous flow via the treated batches of water and a continuous constant rate clarifier allows for the most efficient settling of suspended solids, the surge tank 34 with a suitable proportional valve (not shown) serves the purpose of equalizing the flow of fluid to the clarifier 38. However, in an alternate embodiment of the invention, a surge tank need not be provided.

Flocculation is essentially an operation which relies on agitation in fluid to induce coagulation using a suitable polymer. In this manner, very small suspended particles collide and agglomerate into larger heavier particles or flocs, and settle out. Flocculation is a principal mechanism for removing turbidity from water. Floc growth generally depends on two factors; intermolecular chemical forces and physical action induced by agitation. Any suitable type of process may be used to accomplish flocculation. Some of these procedures may include diffused air, baffles, transverse or parallel shaft mixers, vertical turbine mixers and walking beam type mixers. After flocculation in the flocculator 36, the fluid and floc are transported to the clarifier 38, preferably by gravity flow. The clarifier 38 is generally a sedimentation basin for allowing floc to settle and separate from the water. The clarifier ensures that the settling rate of solids is many times greater than the rise of water. The flocculated solid particles lying on the bottom of the clarifier are forced out of the clarifier into the sludge thickener tank 40 by hydrostatic pressure. The clear treated water (i.e.: the supernatant) then flows out of the clarifier and may be disposed of in any suitable manner. As the solid particles from the bottom of the clarifier 38 are forced into the sludge thickener tank 40, they form a mass of relatively uniform consistency for efficient removal by means of a filter at the filter press 42 or other suitable means. The water from the top of the sludge thickener tank is preferably returned to the surge tank 34 because the transfer process from the clarifier to the thickener tends to free particles which rise or float to the surface. The filtrate liquid being pressed out of the sludge in the filter press is also returned to the surge tank 34. The reprocessing of these two liquids from the sludge thickener 40 and filter press 42, which contains some remaining suspended solids, assists in more efficient settling in the clarifier. The sludge from the filter press can then be placed in suitable containers such as drums and disposed of at an approved facility.

The process sequence of the addition of reagents in the chemical treatment section 12 will now be described with reference to the three reactors R1, R2, and R3. From initial start-up all of the valves V1 through V15 are closed. The main process pump P1 starts and passes water through the filter F1. Valve V1 is opened with valve V2 and valve V3 remaining closed such that the first reactor R1 is filled with a predetermined amount of contaminated water with the level sensor 30 signaling the controller 20 to close valve V1 when a predetermined level of water is reached in the first reactor R1. Upon filling the first reactor R1, valve V2 opens, valve V1 closes and valve V4 opens. Water can now enter reactor R2. Pump P2 is activated and pumps an acid such as hydrochloric acid from the storage tank T1 into the first reactor R1. Valves V5 and V6 are closed to prevent hydrochloric acid from tank T1 entering the second and third reactors R2 and R3 at this time. When the pH level of the fluid in reactor R1 reaches a predetermined level, such as 2.5, the pH sensor 26 signals the controller 20. The controller 20 closes valve V4 and shuts off the pump P2. The valve V7 is then opened and pump P3 activated such that a reducing agent in tank T2, such as sodium metabisulfite, can be transported to the first reactor R1 until such time as the oxidation reduction potential detector 28 in reactor R1 signals the controller 20 that substantially complete reduction of the heavy metal has occurred. The controller 20 then closes valve V7 and shuts off pump P3. Due to the size of the second reactor R2, water is still filling the second reactor R2 at this time. The controller 20 then signals the valve V10 to open and pump P4 is activated and a base from the tank T3 is supplied to the first reactor R1 until the pH sensor 26 signals the controller 20 that a predetermined pH level, such as 9.5, has been obtained. The controller 20 then closes valve V10 and shuts off the pump P4. During this sequence of the addition of reagent chemicals to the first reactor R1, the mixer 24 in the first reactor R1 is suitably activated to mix the reagent chemicals with the water contained in the reactor. After valve V10 is closed and pump P4 is shut off, valve V13 is opened and the treated water or solution from reactor R1 is allowed to drain from the first reactor R1 through the conduit 22 into the surge tank 34. Upon eventually reaching a low level switch, the level sensor 30 signals the controller 20 which closes the valve V13, and turns off the mixer 24. At some point while the first reactor R1 is draining, the second reactor R2 has been filled with water to a predetermined level with its level sensor 30 signalling the controller 20 which closes the valve V2 and opens the valve V3 to start to fill the third reactor R3. Valve V5 is then opened and pump P2 is activated to add acid from tank T1 to the second reactor R2 to lower the pH of the water in the second reactor. After a predetermined pH level is reached in reactor R2, valve V5 is closed and pump P2 is turned off. Valve V8 is then opened and pump P3 is activated to provide a reducing agent from tank T2 to the second reactor R2. Upon signalling by the ORP detector 28 in the second reactor R2, valve V8 is closed and pump P3 is shut off. Valve V11 is then opened and pump P4 is activated to supply a base from the tank T3 to the second reactor R2. During the addition of reagents to the water in the second reactor R2, the mixer 24 in the second reactor R2 is on to properly mix the reagents with the water. Upon indication by the pH sensor 26 in the second reactor R2 that the pH has been increased to a predetermined level, valve V11 is closed and pump P4 is shut off with the controller 20 opening valve V14 and allowing the treated water or solution to exit the chemical treatment section 12 via the conduit 22. When the third reactor R3 has been filled with water, the level sensor 30 signals the controller 20 which closes the valve V3, opens the valve V6 and starts the pump P2 to supply acid from the reagent tank T1 to the third reactor R3. Upon signaling by the pH sensor 26 in the third reactor R3, the controller 20 closes valve V6 and shuts off the pump P2. The controller then opens valve V9 and starts pump P3 to supply a reducing agent from the tank T2 to the third reactor R3. Upon signaling by the ORP detector 28 in the third reactor R3, the controller 20 closes valve V9 and shuts off pump P3. The controller 20 then opens valve V12 and activates pump P4 to supply base from the reagent tank T3 to the third reactor R3. Upon signaling of the pH sensor in the third reactor R3, the controller 20 closes valve V12, turns off pump P4 and opens valve V15 to allow the third reactor to drain until the level sensor 30 in the third reactor R3 signals the controller 20 that a low level has been reached at which point the controller 20 closes valve V15. Upon reactor R3 being filled with water and valve V3 being closed, valve V1 is opened for filling the first reactor R1 with water and the process described above is repeated with the treated water or solution, having been treated in batches, being supplied from the chemical treatment section 12 to the physical treatment section 14 in a relatively continuous flow with the flow from one reactor starting when the flow from another reactor has stopped. The use of batch treatment of the water allows for independent treatment of the water in the reactors with a relatively constant or consistent result of reduction of the hexavalent chromium to trivalent chromium In a preferred embodiment of the invention, all of the valves described above are capable of operating both manually and automatically. In addition, the surge tank 34 is provided with a low level, operate, and high level float switch to signal controllers to operate a surge tank pump. Further, an alarm board would be provided at a console which includes a high level alarm for all of the tanks and/or reactors. A high level alarm would also be provided for high pressure on the process pump. A low flow alarm would also be provided from a flow meter and a high level alarm would be provided at the clarifier.

It should be understood that the foregoing description is only illustrative of the invention. Various alternatives and modifications can be devised by those skilled in the art without departing from the spirit of the invention. Accordingly, the present invention is intended to embrace all such alternatives, modifications and variances which fall within the scope of the appended claims.

What is claimed is:

1. A method of removing heavy metal contaminants from water comprising the steps of:
   transporting a solution of water contaminated with heavy metal contaminants from an aquifer into a container;
   decreasing the pH value of the solution in the container to below 3;
   adding a reducing agent to the solution in the container to react with the heavy metal contaminants;
   increasing the pH value of the solution;
   transporting the increased pH value solution from the container to a flocculator;
   adding a flocculant to the solution at the flocculator;
   mixing the flocculant with the solution;
   transporting the solution with mixed flocculant to a clarifier; and
   clarifying the solution to remove solids from the water.

2. A method as in claim 1 wherein said step of transporting water into a container comprises filtering particulate solids from the water before entry into the container.

3. A method as in claim 1 wherein the step of decreasing the pH value comprises adding acid to the water in the container to lower the pH to between about 1.0 and about 2.0.

4. A method as in claim 3 wherein the acid is hydrochloric acid added at a level of about 1 mg/l relative to the water.

5. A method as in claim 1 further comprising the steps of monitoring and signaling a proper pH level by use of a stationary pH monitor and probe in the container.

6. A method as in claim 5 further comprising the step of controlling the pH value in the container by use of a programmable controller.

7. A method as in claim 6 further comprising the step of monitoring and signaling the reduction action of the reducing agent by use of an oxidation reduction potential detector in the container.

8. A method as in claim 1 wherein the reducing agent is sodium metabisulfite which reduces hexavalent chromium to trivalent chromium.

9. A method as in claim 8 wherein about 250 mg/l of sodium metabisulfite is added to the water.

10. A method as in claim 1 wherein the step of increasing the pH value comprises adding base to the solution in the container to raise the pH to between about 8.5 and about 9.5 in preparation for precipitating an insoluble metal.

11. A method as in claim 10 wherein the base comprises a mixture of about 300 mg/l sodium hydroxide and about 300 mg/l magnesium hydroxide.

12. A method as in claim 1 further comprising the step of transporting the solution from the container to a surge tank and from the surge tank to a flocculator.

13. A method as in claim 12 further comprising the step of analyzing levels of heavy metal contaminants in the solution being transported to the surge tank and signaling an alarm and shutting down the system when heavy metal levels exceed a predetermined level.

14. A method as in claim 12 wherein the flocculant is an anionic polymer added to the solution at a flocculator to form a floc which can readily settle in a clarifier.

15. A method as in claim 14 wherein flocculated solids on the bottom of a clarifier are forced out of the clarifier into a sludge thickener tank by hydrostatic pressure.

16. A method as in claim 15 wherein water from the sludge thickener tank and water from a filter press is returned to the surge tank.

17. A method of removing hexavalent chromium contaminants from groundwater comprising the steps of:
   transporting a solution of water and contaminants from an aquifer into a reactor container;
   decreasing the pH value of the solution in the container;
   adding a reducing agent to the decreased pH value solution in the container;
   increasing the pH value of the solution in the container;
   transporting the increased pH value solution to a flocculator;
   adding a flocculant to the increased pH value solution and flocculating the solution;
   transporting the flocculated solution to a clarifier; and
   clarifying the flocculated solution to remove solids from the water.

18. A method of removing heavy metal contaminants from water comprising the steps of:
   transporting a first batch of water contaminated with heavy metal contaminants into a first reactor container;
   chemically treating the first batch of water in the first container by first decreasing the pH value of the water, then adding a reducing agent to the water, and then increasing the pH value of the water;
   transporting a second batch of water contaminated with heavy metal contaminants into a second reactor container at least partially during the chemical treatment of the first batch of water;
   chemically treating the second batch of water in the second container;
   transporting the chemically treated first batch of water from the first container to a physical treatment area at least partially during chemical treatment of the second batch of water; and
   transporting the chemically treated second batch of water from the second container to the physical treatment area after the first batch such that the water is chemically treated in batches to allow for substantially precise and accurate chemical treatment of the batches of water with a substantially continuous supply of chemically treated water being supplied to the physical treatment area.

19. A method of removing heavy metal contaminants from groundwater comprising the steps of:
   transporting groundwater from an aquifer to a chemical treatment area, the chemical treatment area having multiple reactor containers into which the groundwater is transported, the chemical treatment area also comprising means for independently supplying chemicals to each of the reactor containers;
   sequentially chemically treating groundwater in the reactor containers such that chemical treatment of groundwater in a first reactor container may be completed while chemical treatment of groundwater in another reactor container is still underway, the chemical treatment of the groundwater at each reactor container comprising decreasing the pH value of the groundwater, adding a reducing agent to the groundwater, then increasing the pH value of the groundwater;
   transporting chemically treated groundwater from the chemical treatment area to a physical treatment area, the transporting of chemically treated groundwater comprising the sequential discharge of treated groundwater from reactor containers such that a substantially continuous supply of chemically treated groundwater is supplied to the physical treatment area; and
   physically treating the chemically treated groundwater at the physical treatment area by mixing in a flocculant to the chemically treated groundwater and allowing the solids in the groundwater to settle out of the groundwater.

* * * * *